United States Patent
Fujita

(10) Patent No.: US 6,429,922 B1
(45) Date of Patent: Aug. 6, 2002

(54) MASTER NEGATIVE FILM MAKING APPARATUS, MASTER NEGATIVE FILM MAKING METHOD, AND MASTER NEGATIVE FILM

(75) Inventor: Tadao Fujita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/582,812

(22) PCT Filed: Oct. 29, 1999

(86) PCT No.: PCT/JP99/06028

§ 371 (c)(1),
(2), (4) Date: Sep. 11, 2000

(87) PCT Pub. No.: WO00/26723

PCT Pub. Date: May 11, 2000

(30) Foreign Application Priority Data

Oct. 30, 1998 (JP) .......................................... 10-311176

(51) Int. Cl.$^7$ .............................................. G03B 31/02
(52) U.S. Cl. ........................................ 352/26; 352/27
(58) Field of Search ............................ 352/1, 5, 26, 27, 352/37, 92; 430/140

(56) References Cited

U.S. PATENT DOCUMENTS

| | | | | |
|---|---|---|---|---|
| 4,600,280 A | * | 7/1986 | Clark | 352/37 |
| 4,659,198 A | * | 4/1987 | Beauviala et al. | 352/92 |
| 4,893,921 A | * | 1/1990 | Beauviala | 352/92 |
| 5,327,182 A | * | 7/1994 | Kohut et al. | 352/27 |
| 5,453,802 A | * | 9/1995 | Kohut et al. | 352/27 |
| 5,523,996 A | * | 6/1996 | Kubota | 369/112.07 |
| 5,550,603 A | * | 8/1996 | Yoshimura et al. | 352/27 |
| 5,621,489 A | * | 4/1997 | Kohut et al. | 352/27 |
| 5,639,585 A | * | 6/1997 | Callahan, Jr. et al. | 430/140 |
| 5,666,185 A | * | 9/1997 | Odaka | 352/27 |
| 5,841,513 A | * | 11/1998 | Yoshimura et al. | 352/27 |

FOREIGN PATENT DOCUMENTS

JP 10-20420 * 1/1998

* cited by examiner

Primary Examiner—Russell Adams
Assistant Examiner—Rodney Fuller
(74) Attorney, Agent, or Firm—Crosby, Heafey, Roach & May

(57) ABSTRACT

A reproduction film is made capable of obtaining stable reproduction characteristics constantly. A master negative film is used to transfer data onto a reproduction film upon exposing the master negative film on which the data is recorded at the prescribed gray value, when multiple exposed areas and unexposed areas having the predetermined shape are arranged alternatively, and at the same time, the readout pattern having a guard band between the exposed area and unexposed area on the master negative film to control readout timing of the data transferred to the reproduction film, the width of the guard band is controlled corresponding to the gray value. Thereby, the signal level to be obtained from the reproduction film is to keep the fixed relative value with respect to the signal level to be obtained from the data part transferred to the reproduction film.

15 Claims, 11 Drawing Sheets

MASTER NEGATIVE FILM MAKING APPARATUS, MASTER NEGATIVE FILM MAKING METHOD, AND MASTER NEGATIVE FILM

TECHNICAL FIELD

The present invention relates to a master negative film forming device, a master negative film forming method and a master negative film, and can be suitably applied to the case of recording digital audio data onto movie film for example.

BACKGROUND ART

Heretofore, as shown in FIG. 8, on movie film 1, multiple frame pictures forming a series of moving pictures are recorded sequentially frame by frame, and an analog audio signal track 5 on which analog audio signals are recorded is formed along the internal part of one of two series of perforations 3 provided on both sides in the longitudinal direction of the film. In addition, a digital audio data track 4 on which digital audio data is recorded is formed along the external part of both perforations 3.

As shown in FIG. 9, the digital audio data track 4 of this movie film 1 is composed of multiple blocks representing one bit data per one block, and comprised of line synchronization pattern 8, tracking pattern 9, main signal pattern 10 and azimuth detection pattern 11.

The line synchronization pattern 8 is comprised of multiple blocks for 2 rows in the longitudinal direction of the film and shows whether signal elements exist or not in the main signal pattern 10 in a column direction perpendicularly intersecting to the longitudinal direction of the film. In the case of FIG. 9, two blocks in each column of the line synchronization pattern 8 are unexposed and this shows that signal elements of the main signal pattern 10 exist in each column direction.

The tracking pattern 9 is comprised of multiple blocks for four rows in the longitudinal direction of the film. And this is the checkered pattern showing the exposed part and unexposed part for 2 blocks in each column shifted by a half block with respect to each block of the line synchronization pattern 8.

The main signal pattern 10 is formed of multiple blocks of eight rows in the longitudinal direction of the film on the same level as the line synchronization pattern 8. Digital audio data is recorded on eight blocks in each column, and the azimuth detection pattern 11 for two rows of blocks having the same checkered pattern as the tracking pattern 9 is adapted to appear at the starting point of each frame picture 2.

In such a digital audio data track 4, guard band 12 having the prescribed width is formed in the row and column directions between blocks in the line synchronization pattern 8, the tracking pattern 9 and the main signal pattern 10, which prevents signal elements of a block from the interference (cross-talk) with those of the neighboring blocks in the row and column direction.

In the case of reproducing such movie film 1, while the movie film reproduction device 15 runs the movie film 1 run in the direction shown by an arrow at the prescribed speed, as shown in FIG. 10, it radiates the light source light from the light source 20 to the frame picture 2 of the movie film 1 sequentially frame by frame to project it on a screen 22 as the moving picture via a lens 21.

At the same time, the movie film reproduction device 15 radiates the light source light from the light source 23 to the digital audio data track 4 of the movie film 1 and captures the transmission light of the digital audio data track 4 at the readout timing when the guard band 12 of the tracking pattern 9 in the column direction becomes center in the light receiving area (FIG. 9) of the CCD camera 25.

Then, the movie film reproduction device 15 outputs an output signal of the CCD camera 25 obtained via the tracking pattern 9 to the tracking adjusting circuit 26. The tracking adjusting circuit 26, forming a tracking control signal S1 based on the output signal of the CCD camera 25 and by transmitting this to the CCD camera 25, conducts the tracking adjustment in order that the ratio of upper two blocks of the exposed part and lower two blocks of the unexposed part become equal centering around the guard band 12 of the tracking pattern 9 in the column direction.

On the other hand, the movie film reproduction device 15 outputs the digital audio data of the main signal pattern 10 captured by the CCD camera 25 to a digital conversion circuit 27 while conducting the tracking control within light receiving area by the CCD camera 25. And the digital conversion circuit 27 converts this digital audio data into an analog audio signal and after amplifying this to the prescribed level through an audio signal output circuit 28, outputs sound from a speaker 29.

The movie film 1 is a positive film to be formed by performing optical contact printing on master negative film and blank film which has no picture recorded thereon. Its forming process is that firstly digital audio data is recorded on master negative film at a prescribed gray value (recording density), and after, by performing the contact printing on the master negative film and blank film are contact-printed, the digital audio data is transferred to a positive film, which is blank film, at a proper gray value. Here, the gray value (density) is a value representing a degree of darkness of film. And the proper density is a value of the time when digital audio data to be optically transferred to positive film is recorded at such density as to be correctly read by the reproduction device, and is previously set taking the properties of negative and positive film, the size of digital audio data, the functions of the reproduction device and other conditions into consideration.

In practice, as shown in FIG. 11, the movie film forming device 40 runs a blank film on which nothing is recorded, in the direction shown by an arrow A and moreover, runs a negative film 31 on which digital audio data is recorded, in the same direction as the arrow A at the same speed, and radiates the light source light with the predetermined radiation intensity to the blank film 30 from the light source 32 via the digital audio data track in order to record the digital audio data onto the blank film 30 at the aforementioned proper gray value.

At this point, the movie film forming device 40 records the digital audio data on the blank film 30 and at the same time, runs the negative film 33 on which the still picture is recorded, in the same direction as the arrow A, and by radiating the light source light from the light source 34 to the blank film 30 via the frame of the negative film 33, records multiple still pictures onto the blank film 30 frame by frame.

In this way, the movie film forming device 40 records still pictures and digital audio data on the blank film 30 to form a positive film 35, and displays this on the screen as the movie film 1 via the movie film reproduction device 15 (FIG. 10).

However, in the movie film forming device 40 having the aforementioned configuration, there are cases where printing is performed at a higher gray value (darker) than the proper value when the positive film 35 is formed. And this makes the contrast between exposed areas and unexposed areas clear in the digital audio data track 4 of the positive film 35 and increases the dynamic range.

In practice, as shown in FIG. 12, in the case where the positive film 35 is formed at the higher gray value than the proper value based on the master negative film 31 on which guard band 41 having the prescribed width are formed in the tracking pattern, the blur spread out from the exposed part including the guard band 12 of the positive film 35 to the unexposed part and thus the unexposed area is eroded by the blur.

In such cases, as shown in FIG. 13, a signal level in the tracking pattern 9 of the positive film 35 captured by the CCD camera 25 of the movie film reproduction device 15 (FIG. 10) drops to the level D, almost close to 0 because the area of unexposed part (easy to transmit the light) is decreased by the erosion of blurs.

Accordingly, the most of the unexposed part of the positive film 35 printed at extremely higher gray value than the proper value is all covered with the blur. In such cases, the movie film reproduction device 15 cannot obtain any signal element from the tracking pattern 9 even when the timing of the readout from the light receiving area (FIG. 9) of the CCD camera 25 is shifted a little in the longitudinal direction of the film. And this caused a problem that it was difficult to conduct the tracking adjustment (the readout timing adjustment so that the CCD camera 25 can read the center of a column of the main signal pattern 10 within the light receiving area).

On the other hand, regarding the positive film 35 when the printing is conducted at the lower gray value than the proper value based on the negative film 31, since the exposed part is not fully exposed to light, the area of the unexposed part (easy to transmit the light) is increased as a whole, and as a result, the signal level of the output signal of the CCD camera 25 goes up to the level E.

However, since the tracking pattern 9 and the main signal pattern 10 are printed at the same gray value when the positive film 35 is formed, the signal level of the output signal in the main signal pattern 10 of the CCD camera 25 and the signal level of the output signal in the tracking pattern 9 are almost changed together according to the gray value.

In the movie film reproduction device 15, in the case of binary-judging "1" and "0" of the digital audio data read out from the main signal pattern 10 of the positive film 35, binary data is to be judged by using the signal level obtained from the tracking pattern 9 when printing is conducted at the proper gray value as the threshold level A shown in FIG. 14 in the digital analog conversion circuit 27. In this connection, the threshold level A in the tracking pattern 9 becomes slightly lower than the ideal threshold level (FIG. 13) at the time when the main signal pattern "1" and "0" is judged taking the existence of exposed guard band 12 into consideration.

Accordingly, in the movie film reproduction device 15, when the signal level from the tracking pattern 9 of the positive film 35 drops to D level due to large amount of erosion by the blur, it is necessary to decrease the threshold level A when binary judging "1" and "0" of the digital audio data recorded in the main signal pattern 10. On the other hand, if the gray value is extremely lower than the proper value and the signal level is increased to E level, it is necessary to increase the threshold level A when binary judging "1" and "0" of the digital audio data.

Thus, in the movie film reproduction device 15, although it is necessary to change the threshold level A at the appropriate time when binary judging "1" and "0" of the digital audio data according to the gray value, it is very difficult to change the threshold level A corresponding to the gray value when making the positive film 35 because it requires complicated processing.

DISCLOSURE OF INVENTION

The present invention has been done considering the above points and is proposing a master negative film forming device, a master negative forming method and a master negative film capable of forming reproduction film having stable reproduction characteristics constantly with a simple construction and method.

To obviate such problems according to the present invention, in the case of forming the master negative film when the master negative film on which data is recorded is exposed at the predetermined gray value to transfer the data to the reproduction film, multiple exposed areas and unexposed areas having prescribed shapes are arranged alternately. And in the case of forming the readout pattern having guard bands between an exposed area and an unexposed area, on the master negative film as a pattern for controlling the readout timing of the data transferred to the reproduction film, the width of guard band is controlled based on the gray value, thereby the signal level to be obtained from unexposed areas of the readout pattern transferred to the reproduction film is to keep the fixed relative value with respect to the signal level to be obtained from the data part transferred to the reproduction film.

In the case of forming the readout pattern on the master negative film, the width of the guard band is controlled based on the gray value in order that the signal level to be obtained from the unexposed areas of the readout pattern transferred onto the reproduction film keeps the fixed relative value with respect to the signal level to be obtained from the data part transferred onto the reproduction film. Thereby, the area of unexposed area can be controlled within the area even the quantity of the blur of the exposed area changes according to the gray value of the formed reproduction film, and the data can be read out correctly based on the fixed signal level obtained from the unexposed area.

In the master negative film for transferring prerecorded data onto the reproduction film at the predetermined gray value, multiple exposed areas and unexposed areas having the prescribed shapes are arranged alternately, and at the time when the readout pattern having guard bands between each exposed area and each unexposed area is formed as a pattern for controlling the readout timing of the data, since the width of the guard band is controlled according to the gray value, the signal level to be obtained from unexposed area of the readout pattern transferred onto the reproduction film is to keep the fixed relative value with respect to the signal level to be obtained from the data part transferred onto the reproduction film.

In the case where the readout pattern is formed on the master negative film to be used when the prerecorded data is transferred onto the reproduction film at the prescribed gray value, the width of guard band is controlled according to the gray value so that the signal level to be obtained from the unexposed area of the readout pattern transferred onto the reproduction film keeps the fixed relative value with respect to the signal level to be obtained from the data part transferred onto the reproduction film. Accordingly, even if the amount of the blur of the exposed area changes according to the gray value of the reproduction film, the area of unexposed part is controlled within the fixed area and the data can be correctly read out based on the fixed signal level obtained from the unexposed area.

BEST MODE FOR CARRYING OUT THE INVENTION

The present invention will be described in detail with reference to the accompanying drawings.

Figure 1:
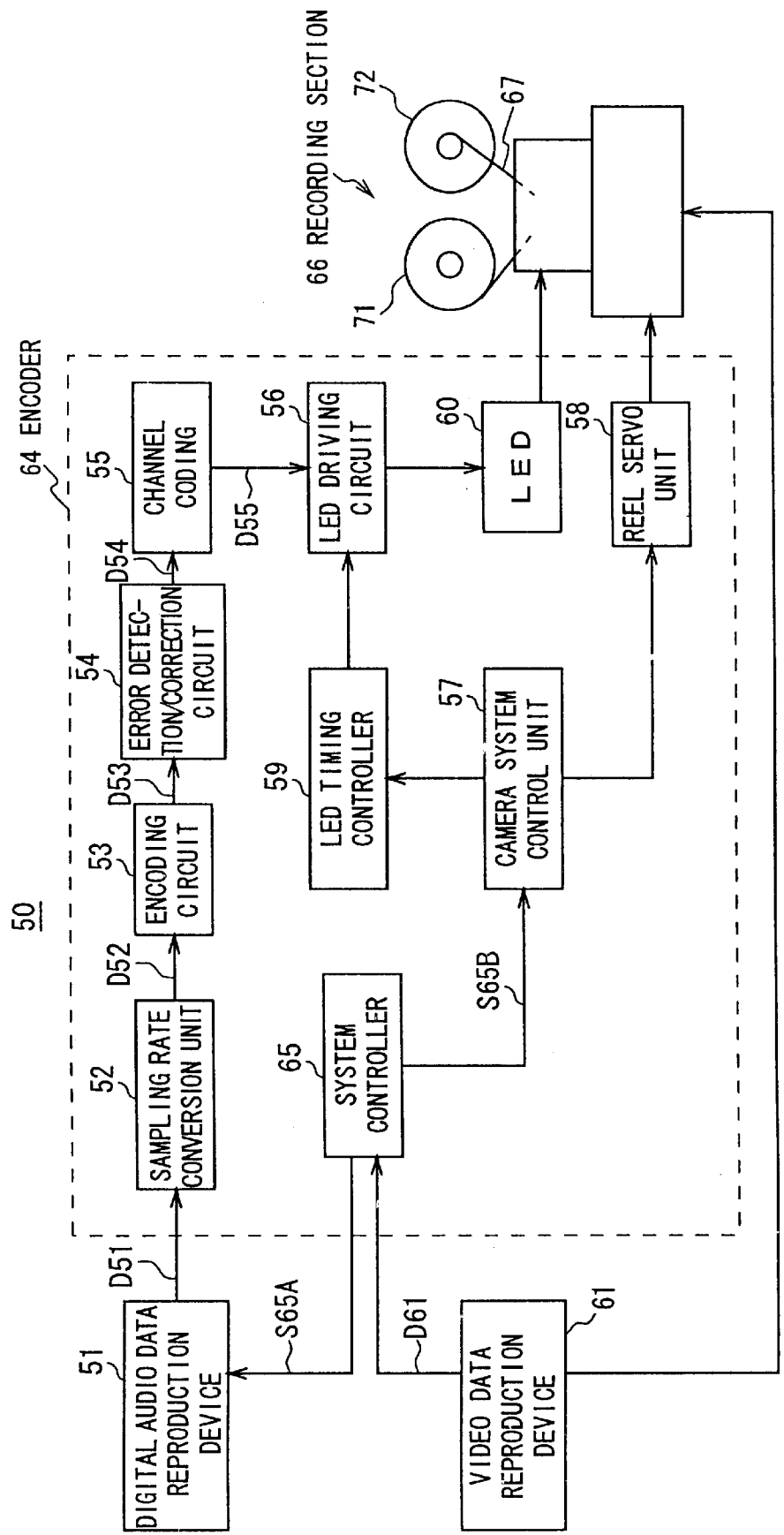
FIG. 1 is a block diagram showing the construction of a master negative film forming device according to the present invention.

In FIG. 1, 50 generally shows a master negative film forming device and this forms a master negative film 67 necessary for forming positive film. This master negative film forming device 50 reads out digital audio data D51 with the digital audio data reproduction device 51, with a control signal S65A transmitted from a system controller 65 of an encoder 64 as a starting time, and transmits the digital audio data D51 to a sampling rate conversion unit 52.

The sampling rate conversion unit 52 converts the sampling frequency of the digital audio data D51 into the predetermined sampling frequency set in the master negative film forming device 50, and transmits this to an encoding circuit 53 as audio data D52. The encoding circuit 53 compression-encodes the audio data D52 with a predetermined method and transmits the resultant to an error detection/correction 54 as audio data D53.

The error detection/correction 54 adds bits for error detection/correction to the audio data D53 and outputs this to a channel coding circuit 55 as audio data D54. The channel coding circuit 55, after conducting the processing such as interchanging the sequence of the audio data D54, outputs the resultant to a light emitting diode (LED) driving circuit 56 as audio data D55.

Furthermore, the system controller 65 supplies control signal S65B to a camera system controller 57. The camera system controller 57 drives the LED driving circuit 56 at the time when receiving the control signal S65B, thereby controlling the radiation time (starting time and time of duration) of LED 60 comprised of multiple luminous elements in accordance with the audio data D55 and moreover, controlling a film supply reel 71 and a film take-up reel 72 of a recording section 66 via a reel servo unit 58.

Figure 2:
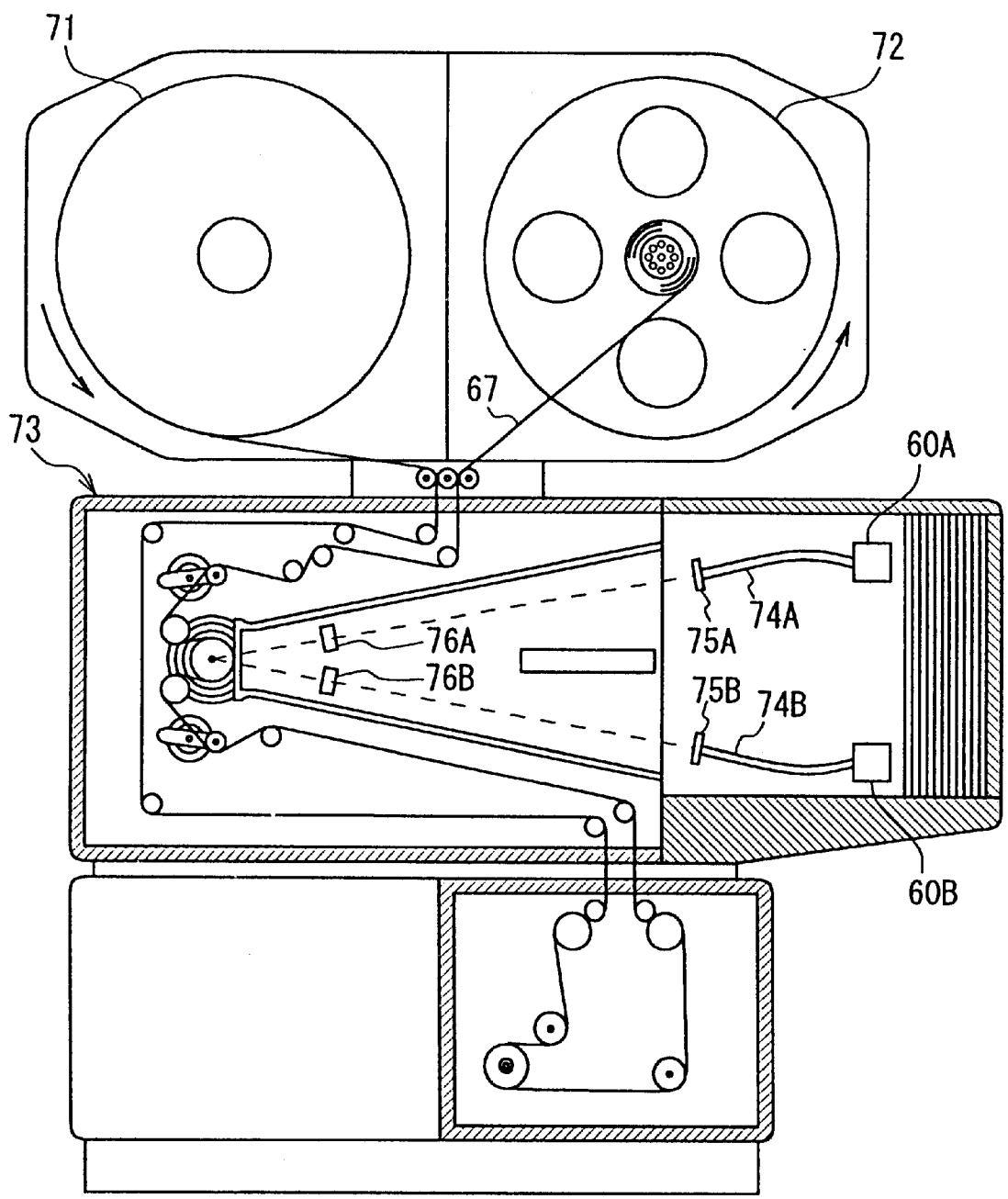
FIG. 2 is a brief linear cross sectional view showing the construction of the recording unit.

In the recording section 66, by rotating the film supply reel 71 and the film take-up reel 72 in the direction of an arrow mark under the control of the reel servo unit 58 (FIG. 1) as shown in FIG. 2, the master negative film 67 run at the prescribed speed through guide rollers of a guide unit 73.

Figure 3A:
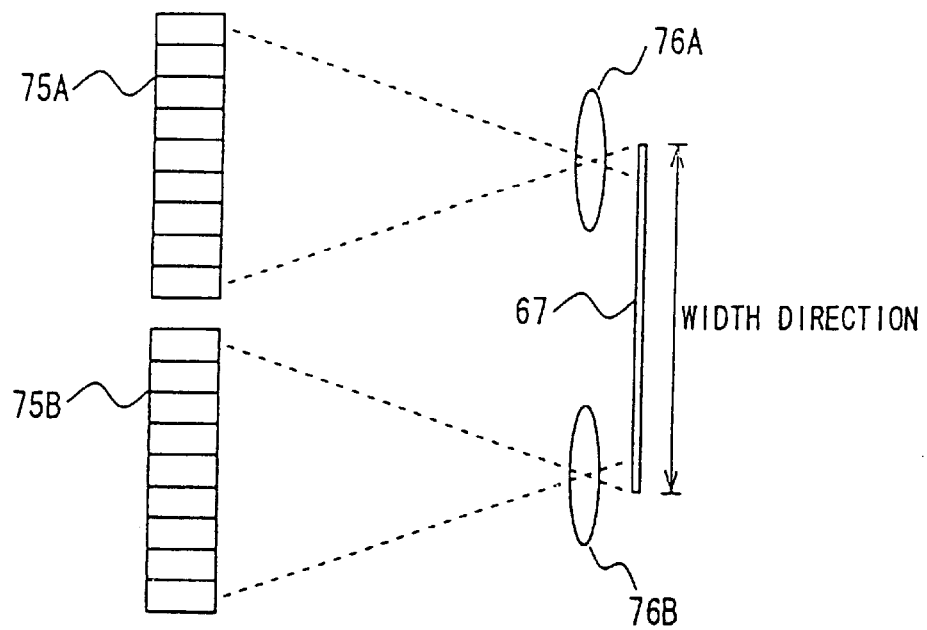
FIG. 3A is a brief linear diagram explaining the recording method of digital audio data onto the master negative film. (No. 1)
Figure 8:
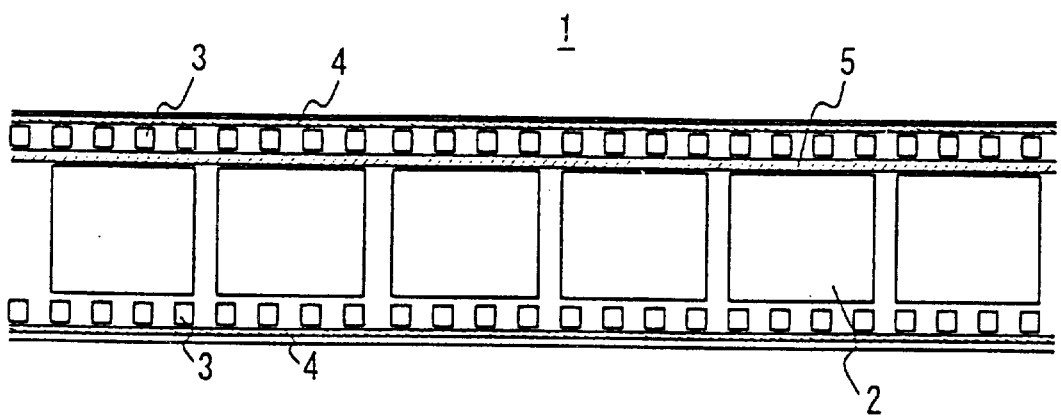
FIG. 8 is a brief linear diagram showing the construction of a movie film.

Moreover, in the recording section 66, the radiation light emitted from the LED 60A and 60B provided in the guide unit 73 goes through optical fiber cables 74A and 74B and is dispersed by slits 75A and 75B shown in FIG. 3A which are provided at the tips of the respective cables. Then, the dispersed lights radiate on the running master negative film 67 through lens 76A and 76B. Otherwise, the recording section can have such a configuration that each optical fiber cables is comprised of a bunch of plural optical fibers and the plural optical fibers are arranged in a column at its tip instead of the slit. In this condition, lights emitted from the optical fiber are emitted at intervals (rigidly, intervals of thickness in an external circumferential coding part of each optical fiber×2).

Figure 3B:
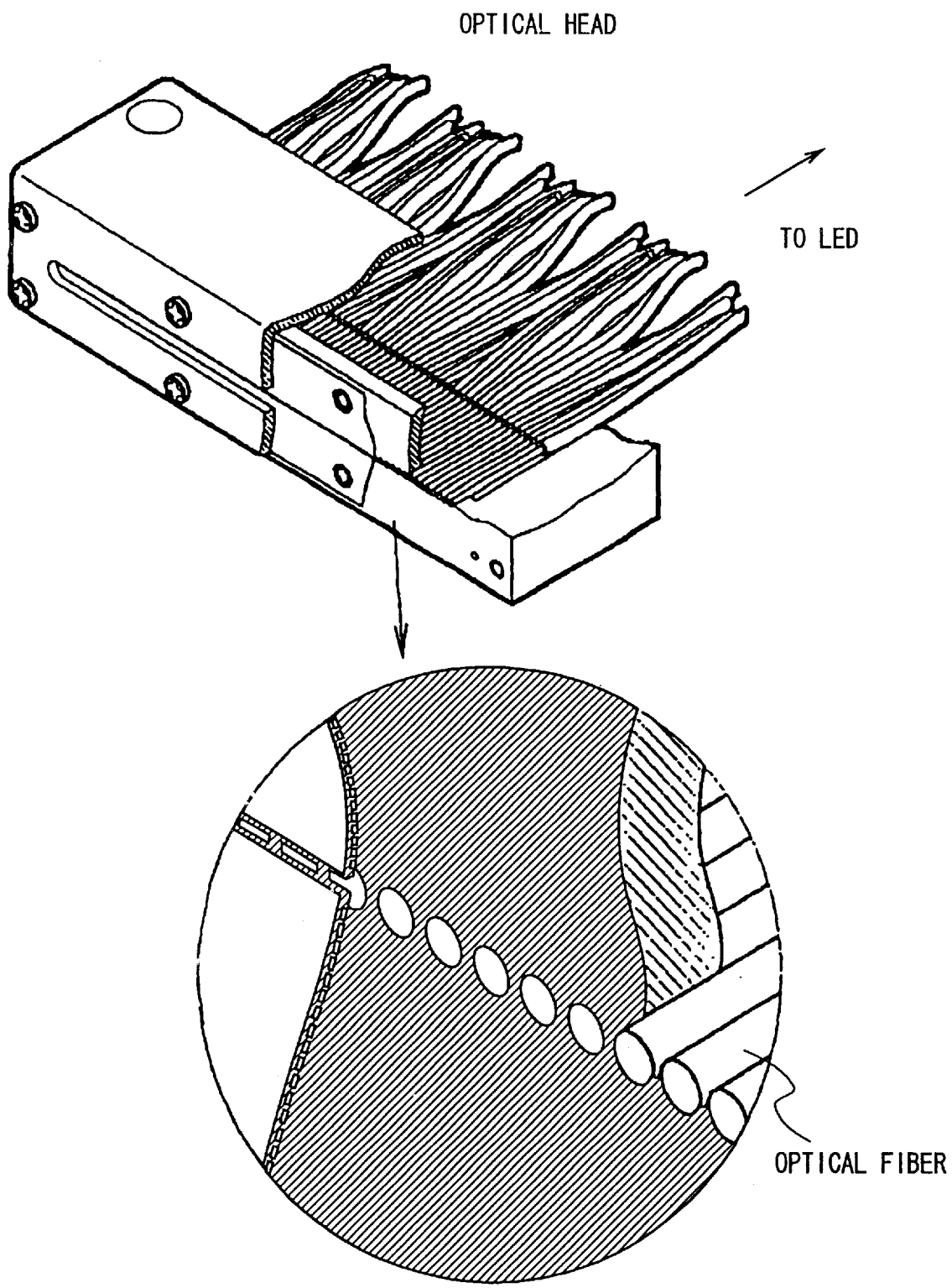
FIG. 3B is a brief linear diagram explaining the recording method of digital audio data onto the master negative film. (No. 2)

In practice, the slits 75A and 75B connected to the LED 60A and 60B by optical fiber cables 74A and 74B are arranged on the both sides in the width direction of the master negative film 67 as shown in FIGS. 3A and 3B. And with this arrangement, the digital audio data track can be formed along the external part of perforations arranged on the both edges of the master negative film 67.

In this way, in the recording section 66, by controlling the radiation time of multiple luminous elements in the LED 60A and 60B based on the audio data D55, digital audio data is recorded along both external sides of perforations of the master negative film 67, and also by controlling the radiation time of multiple luminous elements in the LED 60A and 60B, the line synchronization pattern and the tracking pattern are recorded and the master negative film is formed.

In this connection, the system controller 65 (FIG. 1) outputs control signals S65A and S65B based on the control data D61 supplied from the video data reproduction device 61, and thus, image and sound can be matched to each other and be recorded.

In the case of forming the digital audio data track on the master negative film 67, the system controller 65 according to the present invention controls the width of guard band of the tracking pattern taking the gray value of the time of transfer to the positive film into consideration.

More specifically, the guard band of the positive film is a exposed part, so the amount of erosion by blur spreading out to the unexposed part from the guard band increases in the case of transferring from the master negative film at the high gray value. Considering the above, the system controller 65 is to previously form the width of guard band narrower than the fixed value when forming the master negative film 67.

Figure 4:
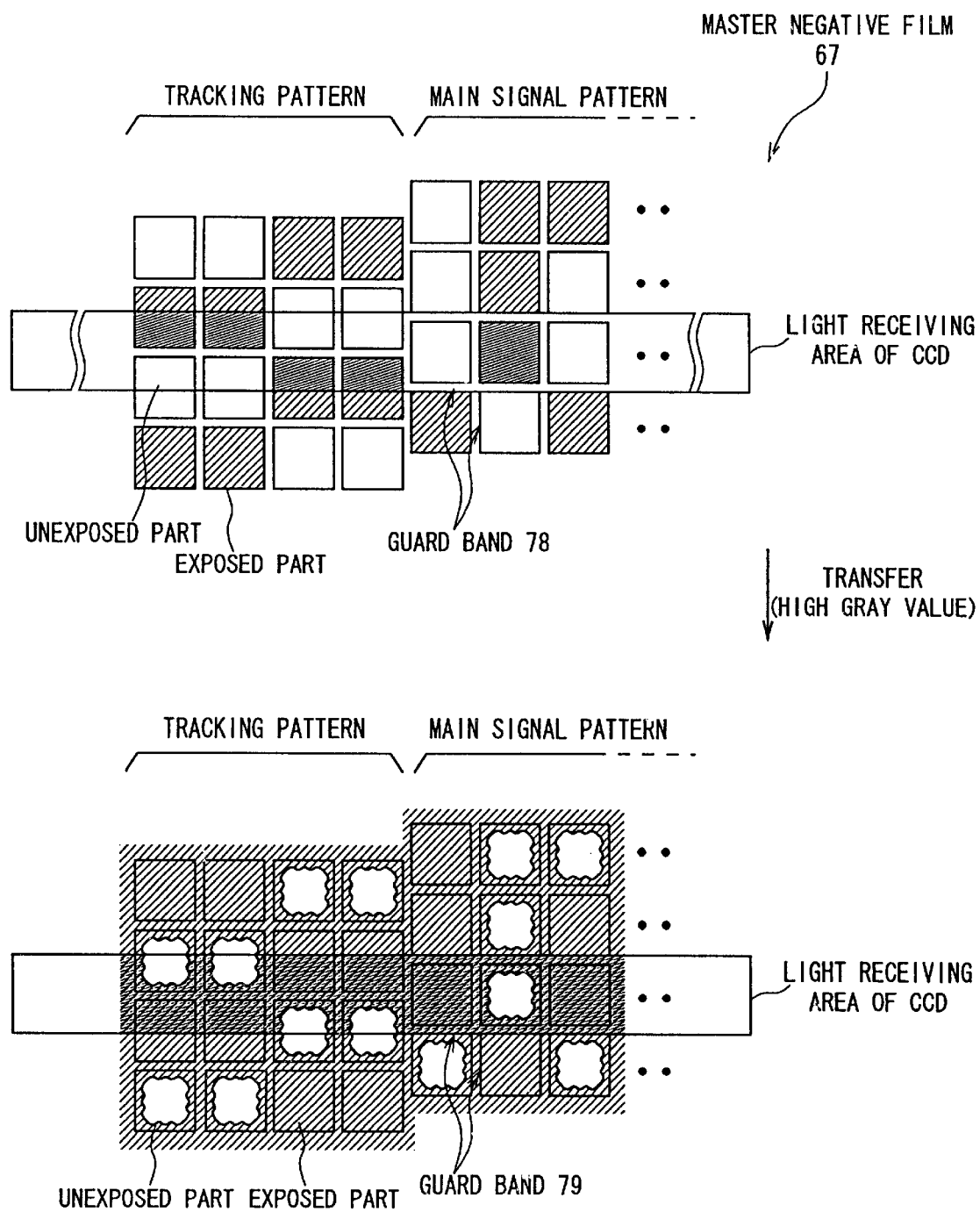
FIG. 4 is a brief linear diagram showing the tracking pattern in which the width of guard band is formed narrower than the prescribed value.

For example, as shown in FIG. 4, in the case where the guard band 79 of the positive film 68 formed from the master negative film 67 becomes the exposed part, the system controller 65 forms the tracking pattern having the guard band 78 with narrower width than the fixed value at the time when forming the master negative film 67 based on the amount of erosion of blur that is determined depending on the degree of gray value.

However, since the system controller 65 forms only the width of guard band 78 of the master negative film 67 narrower but it always keeps guard band in order to prevent the interference between the exposed part and the unexposed part.

The system controller 65 makes only the width of the guard band 78 in the tracking pattern of the master negative film 67 narrow but keeps the width of guard band in the main signal pattern unchanged as it is defined. Thus, the system controller 65 prevents blocks of the main signal pattern from interfering by blur when the positive film 68 is formed at the high gray value. And thus, it prevents ill effect (such as darkness measurement and readout errors in signal part) to the signal characteristics of the time when the data is read out from the positive film 68 in reproduction.

In this connection, since the more the gray value increases, the amount of erosion by blur becomes larger, the system controller 65 stores a table for forming the guard band 78 having the optimum width on the master negative film 67 corresponding to the gray value of the positive film 68, in the internal memory (not shown in Fig.), so as to form the guard band 78 having the optimum width corresponding to the gray value of the time when the positive film 68 is formed on the master negative film 67.

Figure 5:
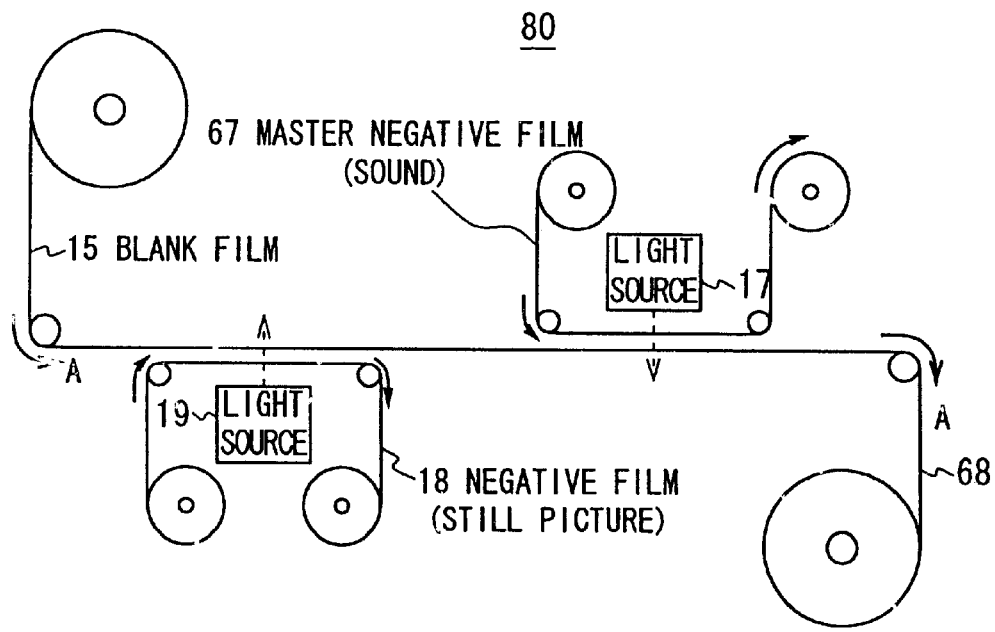
FIG. 5 is a brief schematic diagram showing a movie film forming device.
Figure 11:
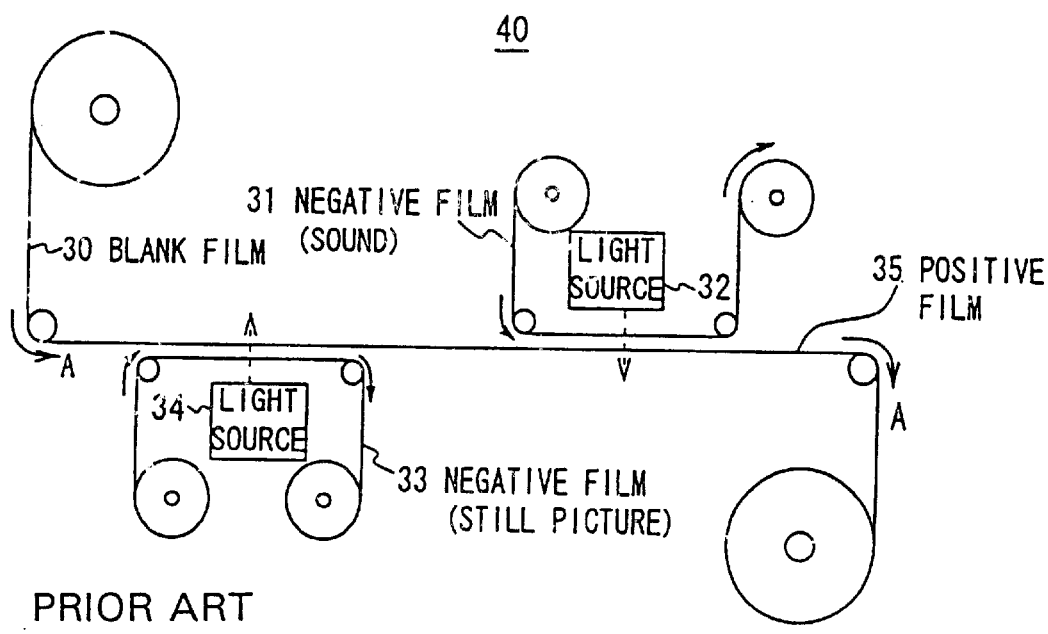
FIG. 11 is a brief linear schematic diagram showing the construction of a movie film forming device.
Figure 12:
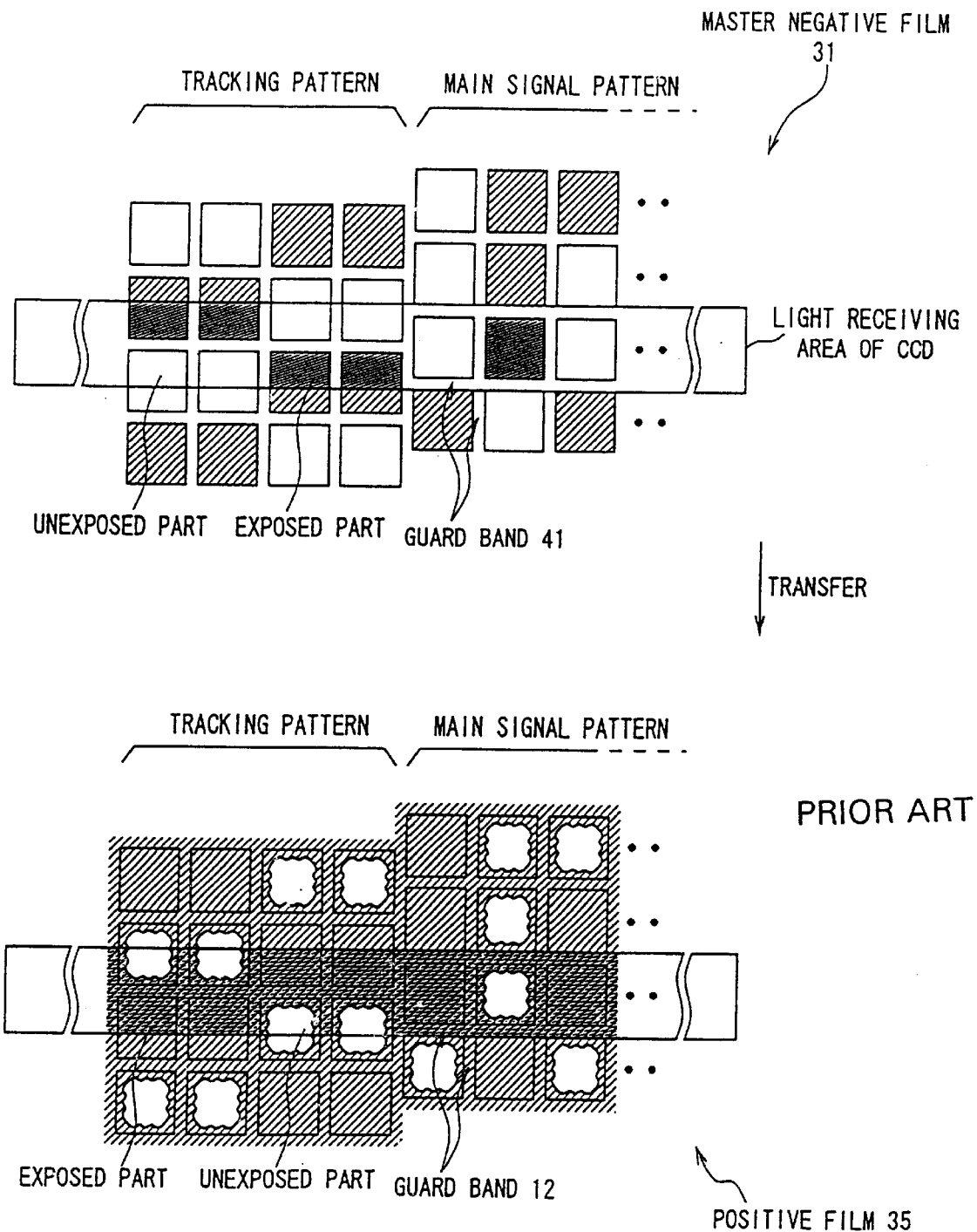
FIG. 12 is a brief linear diagram showing the conventional tracking pattern in which the guard band having the prescribed width is formed.
Figure 13:
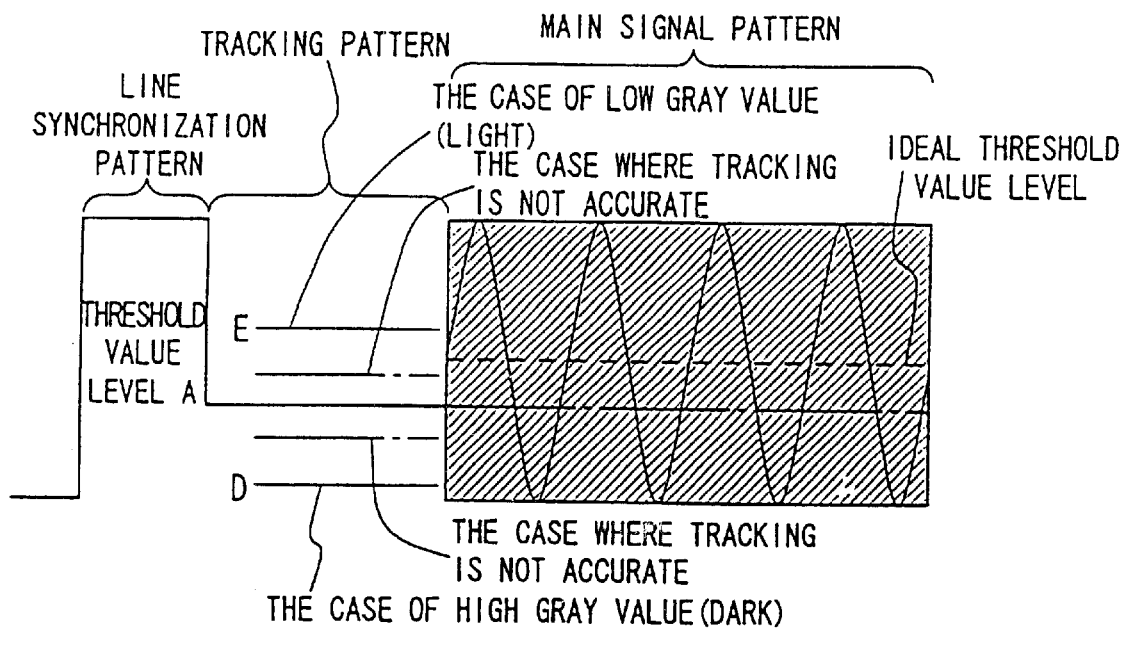
FIG. 13 is a brief linear diagram showing the signal level read out from the positive film.
Figure 14:
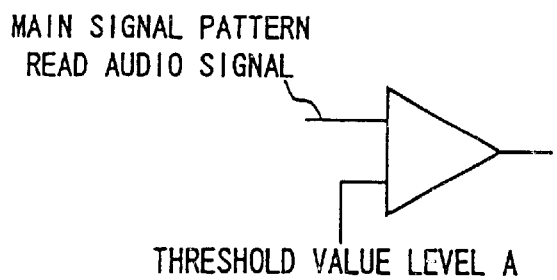
FIG. 14 is a brief linear diagram showing the construction of a circuit for digitalizing the signal read out from the positive film.

In the case of recording digital audio data on the positive film 68 using the master negative film 67 having the digital audio data track on which the guard band 78 with the optimum width corresponding to the gray value is formed as described above, the movie film forming device 80 runs the blank film 15 and also runs the master negative film 67, as shown in FIG. 5, in which the corresponding parts of FIG. 11 are given the same reference numerals, and by radiating the light source light with the light emitting intensity corresponding to the gray value from the light source 17, forms the positive film 68 printed at the higher gray value than the proper value.

At this point, in the positive film 68 formed as described above, an unexposed part is eroded by blur spreading out from the guard band 79 of the tracking pattern. However, since the width of the guard band 78 of the master negative film 67 is formed narrower in advance, the area of unexposed part does not decrease much but has approximately the same area as that when printed at the proper gray value.

Figure 6:
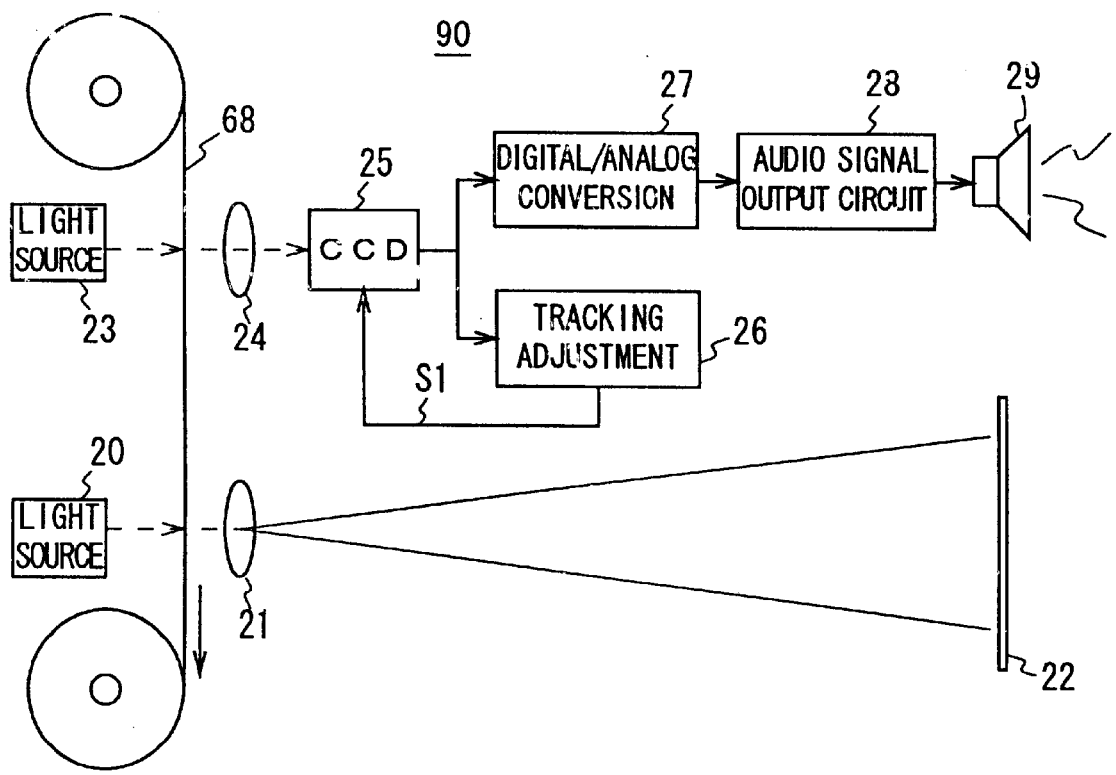
FIG. 6 is a block diagram showing a movie film reproduction device.
Figure 10:
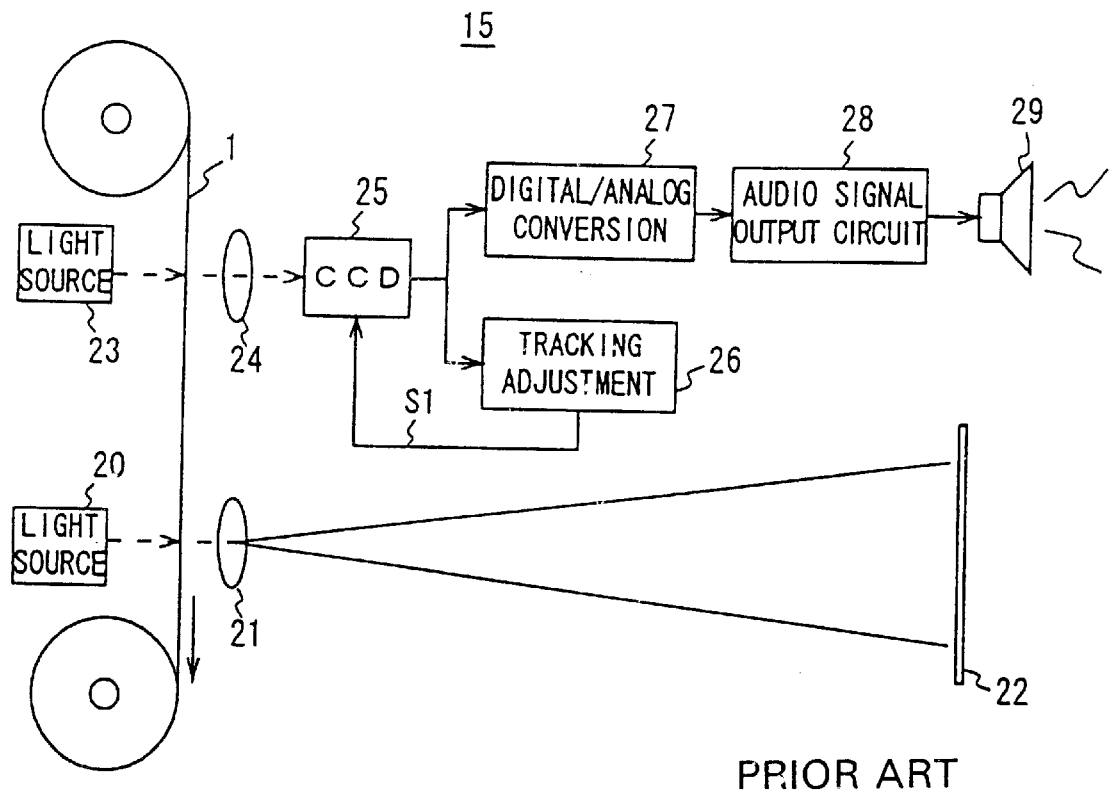
FIG. 10 is a block diagram showing a movie film reproduction device.

In the case of reproducing such positive film 68, as shown in FIG. 6, in which the corresponding parts of FIG. 10 are designated the same reference numerals, the movie film reproduction device 90 radiates the source light from the light source 23 to the digital audio data track of the positive film 68 while running the positive film 68 in the direction shown by an arrow at the fixed speed.

At this point, in the movie film reproduction device 90, although an unexposed part is eroded by blur spreading out from the guard band 79 on the tracking pattern of the positive film 68 in the light receiving area of the CCD camera 25, the area of the unexposed part is almost the same as in the case where it is printed at the proper gray value (FIG. 4) and the signal level of the output signal of the CCD camera 25 never drops.

Accordingly, the movie film reproduction device 90 can correctly conduct the tracking adjustment based on the output signal of the CCD camera 25 to be obtained from the tracking pattern of the positive film so that the ratio of unexposed parts of upper two blocks and lower two blocks centering around the guard band 79 become equal to each other.

Furthermore, since the area of the unexposed part in the tracking pattern of the positive film 68 is approximately the same as in the case where it is printed at the fixed gray value, the movie film reproduction device 90 can obtain the signal level approximately the same as the threshold level A from the output signal of the CCD camera 25, and thus, binary data of the main signal pattern can be correctly judged based on the threshold level A by the digital analog conversion circuit 27.

In this connection, since even in the case where the level of output signal to be obtained from the CCD camera 25 varies, the movie film reproduction device 90 normalizes the output signal with the peak value at which the output signal has the highest brightness as "1", and conducts the binary judgment using the threshold level A obtained in the tracking pattern. Therefore, the binary judgment can be conducted correctly on the scattering of the quantity of light of the light source 23 and the scattering of transparency degree of the unexposed part.

According to the foregoing construction, in the case of forming the digital audio data track of the master negative film 67, the master negative film forming device 50 forms the guard band 78 with the predetermined width corresponding to the gray value when forming the positive film 68 from the master negative film 67 based on the control of the system controller 65, on the tracking pattern.

More specifically, since the more the gray value of positive film becomes higher than the proper level, the area of erosion of blur spreading out from the guard band 79 of the tracking pattern becomes larger. Considering the above, the system controller 65 previously forms the width of guard band 78 narrower than the fixed value when forming the master negative film 67.

Thus, in the case where digital audio data is reproduced from the positive film 68 formed by using the master negative film 67 having the digital audio data track on which the guard band 78 with the width narrower than the fixed value is formed corresponding to the gray value of the positive film, the signal level of output signal of the CCD camera 25 to be obtained from the tracking pattern of the positive film 68 is remained at the constant level by the threshold level A with respect to the signal level of the reproduction signal to be obtained from the main signal pattern.

Since the master negative film forming device 50 forms the guard band 78 having the predetermined width corresponding to the gray value when forming the positive film 68 on the tracking pattern of the master negative film 67, the signal level of output signal of the CCD camera 25 to be obtained from the tracking pattern of the positive film 68 formed by using the master negative film 67 can be maintained always as the constant relative value with respect to the signal level of the reproduction signal to be obtained from the main signal pattern.

According to the foregoing construction, since the master negative film forming device 50 forms the guard band 78 having the predetermined width corresponding to the gray value when forming the positive film 68 from the master negative film 67 under the control of the system controller 65 on the tracking pattern, the signal level of output signal of the CCD camera 25 to be obtained from the tracking pattern of the positive film 68 can be maintained as the fixed relative value represented by the threshold level A with respect to the signal level of the reproduction signal to be obtained from the main signal pattern when reproducing the positive film 68 formed at the gray value higher than the proper value by using the master negative film 67. Accordingly, the tracking adjustment can be conducted correctly and the digital audio data can be also correctly restored based on the threshold level A.

Furthermore, since the positive film 68 of this case is printed at the gray value higher than the proper value using the master negative film 67 on which the guard band 78 having the predetermined width corresponding to the gray value is formed, contrast between the exposed part and unexposed part is very clear and scratch marks is not easily put on the dark exposed part.

Moreover, although the positive film 68 is printed at the gray value higher than the proper value, the area of unexposed part does not decrease, and since the signal level to be obtained from the unexposed part is kept always as the fixed relative value with respect to the signal level of the reproduction signal, its effects is very small even if the signal level at the time of reproduction drops due to the scratch on the clear unexposed part and the possibility of misoperation in tracking adjustment and binary judgment can be decreased.

Figure 7:
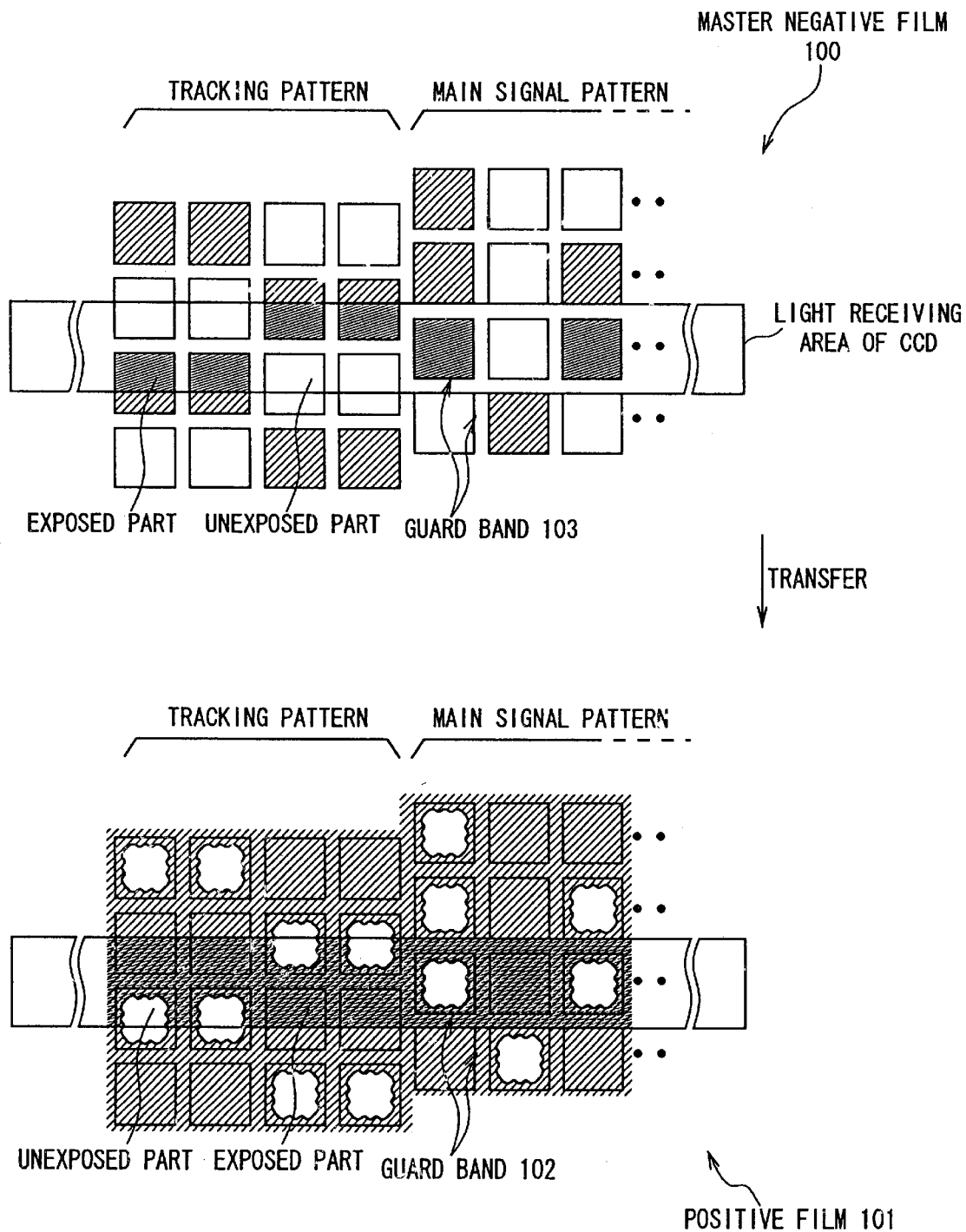
FIG. 7 is a brief linear diagram showing the tracking pattern according to another embodiment.
Figure 9:
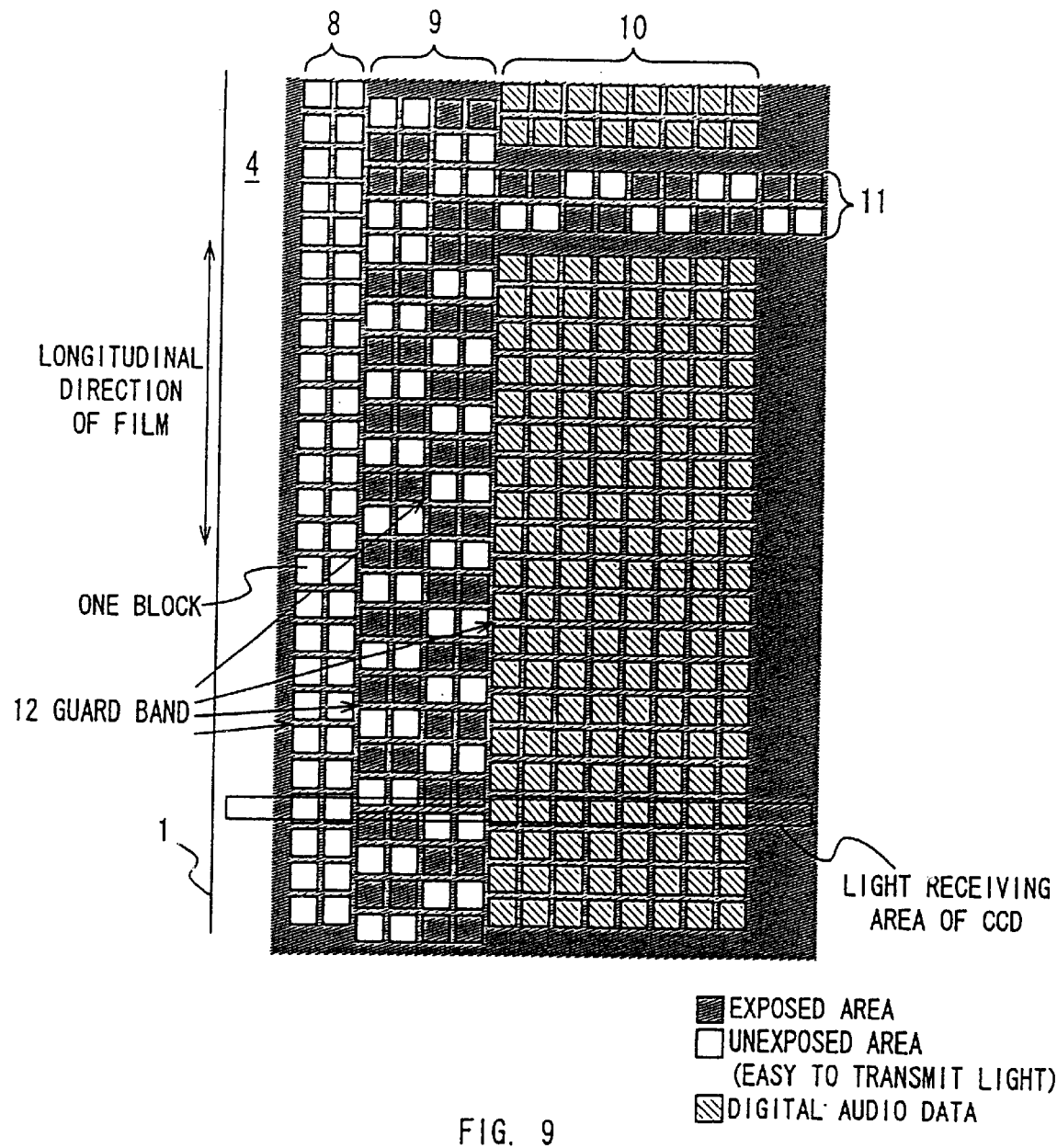
FIG. 9 is a brief linear enlarged diagram showing the digital audio data track.

Furthermore, the embodiment described above has dealt with the case of forming the width of guard band 78 of the master negative film 67 narrower than the fixed value under the control of the system controller 65 of the master negative film forming device 50 in the case where the gray value when forming the positive film 68 is higher than the proper value and the guard band 79 of the positive film 68 becomes an exposed part. However, the present invention is not only limited to this but also when the guard band 102 of the positive film 101 becomes an unexposed part as shown in FIG. 7, the width of the guard band 103 may be formed wider than the fixed value considering the amount of erosion of blur spreading out from the exposed part corresponding to the gray value at the stage of forming the master negative film 100.

Furthermore, the embodiment described above has dealt with the case of making the gray value high when forming the positive film 68 from the master negative film 67. However, the present invention is not only limited to this but also it can be applied to the case of making the gray value low. For example, in the case of forming the positive film 68, if the gray value is lower than the proper value and the guard band 79 of the positive film 68 becomes an exposed part, the width of the guard band 78 of the master negative film 67 may be formed wider than the fixed value under the control of the system controller 65. And when the guard band 79 of the positive film 68 becomes an unexposed part, the width of guard band 78 of the master negative film 67 may be formed narrower than the fixed value under the control of the system controller 65.

Furthermore, the embodiment described above has dealt with the case of controlling the width of guard band 12 of the tracking pattern 9 of the main signal pattern 10 column by column under the control of the system controller 65 and the camera system controller 57 as control means in the case of forming the digital audio data track as the readout pattern on the master negative film 67 by the encoder 64 and the recording section 66 as the readout pattern forming means of the master negative film forming device 50. However, the present invention is not only limited to this, but also the width of guard band arranged on the azimuth detection pattern 11 appearing every frame may be controlled. In this case, the azimuth detection pattern can be certainly read out and the starting time of each frame can be identified correctly.

According to the present invention as described above, in the case of forming the readout pattern on the master negative film, by controlling the width of guard band corresponding to the gray value so that the signal level to be obtained from an unexposed area of the readout pattern transferred to the reproduction film keeps the fixed relative value with respect to the signal level to be obtained from the data part transferred to the reproduction film, the area of the unexposed area can be controlled within the fixed area and data can be read out correctly based on the fixed signal level obtained from the unexposed area even though the amount of blur in the exposed area varies according to the gray value of the reproduced film. And thus, a master negative film forming device and a master negative film forming method capable of forming reproduction film constantly having stable reproduction characteristics can be realized.

Furthermore, according to the present invention, in the case where the readout pattern is formed on the master negative film to be used when transferring the data to the reproduction film after exposing at the prescribed gray value, since the width of guard band is controlled according to the gray value so that the signal level to be obtained from unexposed area of the readout pattern transferred to reproduction film keeps the fixed relative value with respect to the signal level to be obtained from the data part transferred to the reproduction film, the area of unexposed area is controlled within the fixed area even though the amount of blur in the exposed area varies corresponding to the gray value of the reproduced film. And the data can be read out correctly based on the fixed signal level obtained from unexposed area, and thus, a master negative film for forming the reproduction film constantly having stable reproduction characteristics can be realized.

INDUSTRIAL APPLICABILITY

This invention can be utilized for a movie film forming device which record digital audio data on a movie film.

What is claimed is:

1. A master negative film forming device for forming a master negative film in the case of transferring data to a reproduction film upon exposing said master negative film on which the data is recorded at the predetermined gray value, comprising:

readout pattern forming means for placing multiple exposed areas and unexposed areas having predetermined shapes alternately and forming a readout pattern having a guard band between said exposed area and said unexposed area on said master negative film as a pattern for controlling the readout timing of the data transferred onto said reproduction film; and guard band width control means for keeping the signal level to be obtained from an unexposed area of the readout pattern transferred to said reproduction film, at the fixed relative value with respect to the signal level to be obtained from the part of the data transferred onto said reproduction film, by controlling the width of said guard band corresponding to the gray value in the case of forming said readout pattern onto said master negative film by said readout pattern forming means.

2. The master negative film forming means according to claim 1, wherein said guard band width control means forms the width of said guard band on said master negative film narrower than the prescribed value in the case where said gray value of time when transferring the data recorded on said master negative film onto said reproduction film is higher than the proper value and the guard band transferred to said reproduction film becomes the exposed area.

3. The master negative film forming device according to claim 1, wherein
said guard band width control means forms the width of said guard band on said master negative film wider than the prescribed value in the case where said gray value of the time when transferring the data recorded on said master negative film onto said reproduction film is higher than the proper value and the guard band transferred to said reproduction film becomes the unexposed area.

4. The master negative film forming device according to claim 1, wherein
said guard band width control means forms the width of said guard band on said master negative film wider than the prescribed value in the case where said gray value of the time when transferring the data recorded on said master negative film onto said reproduction film is lower than the proper value and the guard band transferred onto said reproduction film becomes the exposed area.

5. The master negative film forming device according to claim 1, wherein
said guard band width control means forms the width of said guard band on said master negative film narrower than the prescribed value in the case where said gray value of the time when transferring the data recorded on said master negative film is lower than the proper value and the guard band transferred onto said reproduction film becomes the unexposed area.

6. A master negative film forming method of forming a master negative film in the case of exposing a master negative film on which data is recorded at the predetermined gray value and transferring the data onto a reproduction film, wherein
in the case of placing multiple exposed areas and unexposed areas having predetermined shapes alternately and moreover, forming a readout pattern having a guard band between said exposed area and unexposed area on said reproduction film as a pattern for controlling the readout timing of the data transferred onto said reproduction film, the signal level to be obtained from the unexposed area of the readout pattern transferred onto said reproduction film is kept at the fixed relative value with respect to the signal level to be obtained from the part of the part transferred to said reproduction film, by controlling the width of said guard band according to the gray value.

7. The master negative film forming method according to claim 6, wherein
in the case where the gray value of the time when transferring the data recorded on said master negative film onto said reproduction film is higher than the proper value and the guard band transferred to said reproduction film becomes the exposed area, the width of said guard band on said master negative film is formed narrower than the prescribed value.

8. The master negative film forming method according to claim 6, wherein
in the case where the gray value of the time when transferring the data recorded on said master negative film to said reproduction film is higher than the proper value and the guard band transferred to said reproduction film becomes the unexposed area, the width of said guard band on said master negative film is formed wider than the prescribed value.

9. The master negative film forming method according to claim 6, wherein
in the case where the gray value of the time when transferring the data recorded on said master negative film onto said reproduction film is lower than the proper value and the guard band transferred onto said reproduction film becomes the exposed area, the width of said guard band on said master negative film is formed narrower than the prescribed value.

10. The master negative film forming method according to claim 6, wherein
in the case where the gray value of the time when transferring the data recorded on said master negative film onto said reproduction film is lower than the proper value and the guard band transferred onto said reproduction film becomes the unexposed area, the width of said guard band on said master negative film is formed narrower than the prescribed value.

11. A master negative film for transferring prerecorded data to a reproduction film at a predetermined gray value,
wherein a width of a guard band is controlled according to a gray value in the case where multiple exposed areas and unexposed areas having predetermined shapes are placed alternatively and a readout pattern having a guard band between said exposed area and unexposed area is formed as a pattern for controlling the readout area of the data, the signal level to be obtained from the unexposed area of the readout pattern transferred to said reproduction film is kept at the constant relative value with respect to the signal level to be obtained from the part of the data transferred to said reproduction film.

12. The master negative film according to claim 11, wherein
in said master negative film, the width of said guard band is formed narrower than the prescribed value in the case where the gray value of the time when transferring to the reproduction film is higher than the proper value and the guard band transferred to said reproduction film becomes the exposed area.

13. The master negative film according to claim 11, wherein
in said master negative film, the width of said guard band is formed wider than the prescribed value in the case where the gray value of the time when transferring to the reproduction film is higher than the proper value and the guard band transferred to said reproduction film becomes the unexposed area.

14. The master negative film according to claim 11, wherein
in said master negative film, the width of said guard band is formed wider than the prescribed value in the case where the gray value of the time when transferring to said reproduction film is lower than the proper value and the guard band transferred to said reproduction film becomes the exposed area.

15. The master negative film according to claim 11, wherein
in said master negative film, the width of said guard band is formed narrower than the prescribed value in the case where the gray value of the time when transferring the data to said reproduction film is lower than the proper value and the guard band transferred to said reproduction film becomes the unexposed area.

* * * * *